United States Patent [19]

Dieter

[11] 4,182,378

[45] Jan. 8, 1980

[54] SPACING ELEMENT FOR SPACING AN INNER PIPE FROM AN OUTER PIPE

[75] Inventor: Kurt Dieter, Nehren, Fed. Rep. of Germany

[73] Assignee: Dieter Spezial-Isolierungen GmbH & Co., Nehren, Fed. Rep. of Germany

[21] Appl. No.: 842,922

[22] Filed: Oct. 17, 1977

[30] Foreign Application Priority Data

Oct. 20, 1976 [DE] Fed. Rep. of Germany ....... 2647235

[51] Int. Cl.² .............................................. F16L 9/18
[52] U.S. Cl. .................................... 138/112; 138/113; 138/114; 138/148
[58] Field of Search ............... 138/113, 112, 114, 158, 138/161, 162, 148, 108

[56] References Cited

U.S. PATENT DOCUMENTS

| 167,179 | 8/1875 | Leidy | 138/158 |
|---|---|---|---|
| 1,208,708 | 12/1916 | King | 138/158 |
| 1,535,162 | 4/1925 | Kime | 138/158 |
| 2,324,181 | 7/1943 | Tulien | 138/161 |
| 3,455,336 | 7/1969 | Ellis | 138/158 |
| 3,757,031 | 9/1973 | Izraeli | 138/162 |
| 3,909,885 | 10/1975 | Sinko | 138/113 |

*Primary Examiner*—Lenard A. Footland
*Attorney, Agent, or Firm*—Michael J. Striker

[57] ABSTRACT

A spacing element for spacing a pipe from a protective pipe outwardly surrounding the latter, has an annular body including a plurality of segments adapted to be placed on an outer surface of the pipe and each having a plurality of projections provided with sliding surfaces and adapted to abut against the protective pipe. The spacing element further includes a plurality of electrically insulating wedge-shaped connecting portions for connecting the segments with one another. The connecting portions may be formed as trough-shaped members embracing trough-shaped flanges of the segments. The connecting portions may also be formed as wedge members insertable into bores of a projection of one of the segments engaging a recess of an adjacent segment, or fixable to an outer surface of such projection. Additional connecting members such as electrically insulating pins, straps and strings may be provided for connecting the segments with one another.

24 Claims, 9 Drawing Figures

SPACING ELEMENT FOR SPACING AN INNER PIPE FROM AN OUTER PIPE

BACKGROUND OF THE INVENTION

The present invention relates to a spacing element for spacing an inner pipe from a protective pipe outwardly surrounding said inner pipe.

Spacing elements for spacing pipes from outer protective pipes have been proposed in the art. Such spacing elements have a plurality of segments of a synthetic plastic material which are placed on an outer surface of the inner pipe and each has a plurality of projections abutting against an inner surface of the outer pipe and having slide surfaces. The segments of the known spacing elements are connected with one another by metallic bolts. The bolts generally are not brought in contact with either the outer protective pipe or with the inner pipe extending through the latter, so that an electrical path is not established between the pipe and the protective pipe in order to assure unobjectionable corrosion protection. However, when the spacing element is accidentally broken, a danger will occur that the metallic connecting bolts will establish the electrical path between the pipe and the protective pipe and thereby will break cathodic protection of the former.

SUMMARY OF THE INVENTION

Accordingly, it is an object of the present invention to provide a spacing element for spacing a pipe from an outer protective pipe, which avoids the disadvantages of the prior art.

More particularly, it is an object of the present invention to provide a spacing element for spacing a pipe from an outer protective pipe, which eliminates a danger of establishing an electrical path between the pipes and thereby breaking a cathodic protection of the inner pipe.

Another feature of the present invention is to provide such a spacing element for spacing a pipe from an outer protective pipe in which connecting means for connecting segments of an annular body of the spacing elements do not include electrically conducting parts.

In keeping with these objects, and with others which will become apparent hereinafter, one feature of the present invention, briefly stated, resides in a spacing element which has a body portion including a plurality of segments adapted to be placed on an outer surface of an inner pipe and having a plurality of projections adapted to abut against an inner surface of a protective pipe, and means for connecting the segments with one another including a plurality of electrically insulating wedge-shaped connecting portions. The segments are constituted of an electrically insulating material. The connecting portions are constituted of a non-metallic preferably synthetic resin material.

In the spacing element in accordance with the present invention the connecting portions are electrically insulating, and therefore even in the case when the spacing element is broken the thus-constructed connecting portions will not establish an electrical path and, therefore, there will not be a danger that a cathodic protection of the pipe will be broken.

Another feature of the present invention is that each of the segments may be provided with two flange portions each located at a respective end of the segment and having a wedge surface. The connecting portions may be formed as clamping members each having an opposite wedge surface cooperable with the wedge surface of a respective flange portion so as to connect the adjacent segments with one another.

A further feature of the present invention is that the flange portions of the segments and the clamping members are trough-shaped, and the flange portion has an inclined free edge defining the wedge surface, whereas the clamping member has a further surface defining the opposite wedge surface. The trough-shaped clamping members engage the flange portions of two adjacent segments and connect the latter with one another.

Each of the flange portions may have two inclined free edges each extending from a respective end towards one another and up to a central plane of the flange portion so that two such trough-shaped clamping members may be shifted over the two free edges from the opposite ends of the flanges. The thus-formed free edges of the flange portions may be inclined relative to a longitudinal axis of the segments at identical angles. When the trough-shaped clamping members are shifted over the trough-shaped flange portions from the opposite ends and move towards one another in the direction of the longitudinal axis, for instance by hammer impacts, the segments of the annular body will tightly embrace the pipe to be protected with pressure fit. The clamping members have great contact surfaces and therefore provide for good force distribution in the connected position.

A still further feature of the present invention is that means are provided for preliminary mounting of the segments before their clamping on the pipe. Such means include bores provided in the flange portions adjacent to one or both ends thereof and in the clamping members, which bores are alignable with one another, and also include shearing pins insertable in the bores in aligned condition of the latter so as to preliminarily connect the segments and the clamping members with each other. The shearing pins are constituted of an electrically insulating material such as wood. An additional means for preliminarily connecting the segments may be provided, including a plurality of bores formed in the projections of the segments and aligning with one another, and a cored insertable into the bores of the projections of the segments so as to preliminarily connect the latter with one another. The thus-connected segments cannot be removed from the pipe during mounting of the spacing element on the latter.

Still another feature of the present invention is that respective surfaces of the flange portions of the segments and the clamping members may be provided with teeth meshing with one another so as to further improve the fitting of the clamping members onto the flange portions. The teeth may extend substantially parallel to those surfaces of the segments which abut against the outer surface of the pipe to be protected. Such construction is advantageous inasmuch as in this case all the segments may be made completely symmetrical and may have the identical flange portion, and furthermore inasmuch as the clamping members for connecting the thus-constructed segments may also be identical with one another.

Finally, end sections of the segments may be differently formed so that for instance one end section of the segment has a connecting projection and the other end section of the segment has a connecting recess engaging the connecting recess and the connecting projection, respectively, of an adjacent segment. The connecting projection may have a through bore for inserting a wedge member into the bore or an outer surface for shifting a wedge member over the latter. The projection and/or the recess and/or the wedge member may be provided with teeth on respective surfaces facing towards one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
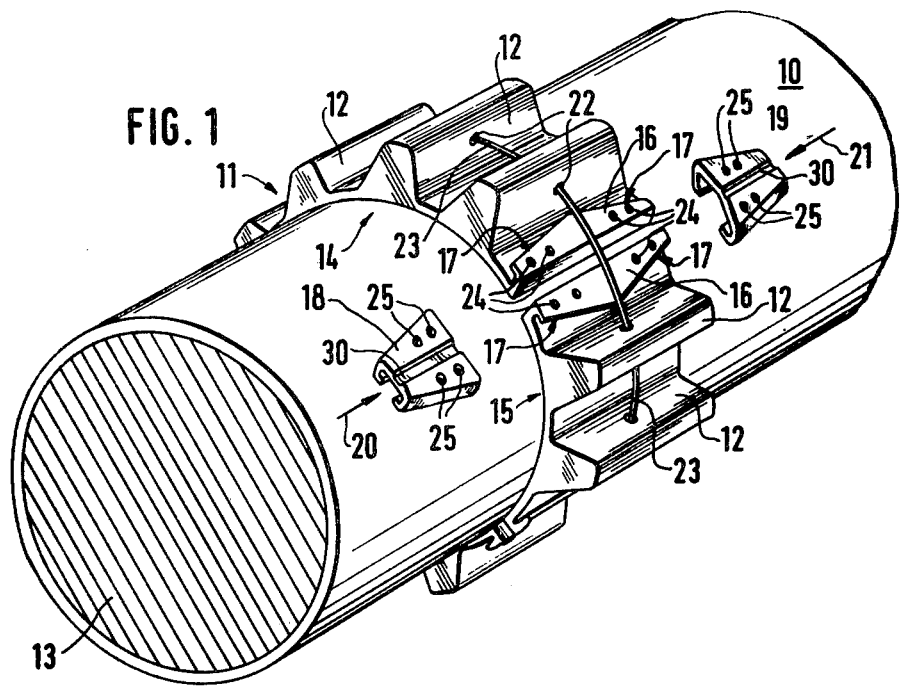
FIG. 1 is a perspective view of a spacing element for spacing a pipe from a protecting pipe in accordance with the present invention, with disengaged clamping members in a position of connection of adjacent segments of the spacing element.

FIG. 1 shows a pipe 10, for instance of an oil circuit, which extends through a protective pipe and is spaced from the latter by means of a spacing element. The protective pipe is known per se in the art and for this reason is not shown in the drawing. The spacing element has an annular body 11 including a plurality of segments of an electrically insulating material such as a synthetic plastic material. Each of the segments has a plurality of rib-shaped projections 12. The annular body 11 of the spacing elements serves also as a slide member for slidable insertion of the pipe 10 in the not shown protective pipe. The projections 12 in this case serve as slide skids. For insertion of the pipe 10 in the protective pipe, a front opening of the former is closed with a cover 13.

The annular body 11 of the spacing element may include a varying number of segments, and the segments may have different dimensions as shown in FIG. 1, where two segments 14 and 15 are of different lengths in the circumferential direction. It is understood that the segments may also have identical dimensions. The segments 14 and 15 are tightly fitted by their inner surfaces on an outer surface of the pipe 10 and are connected with one another and with adjacent segments at their ends. For this purpose trough-shaped flanges 16 are provided at the ends of the segments 14 and 15. Each of the flanges 16 has free edges each extending from an end of a respective flange and forming a wedge surface 17. As shown in FIG. 1, each of the flanges has two such free edges 17 extending up to a central plane of the flange which plane is normal to a longitudinal axis of the latter. However, it is understood that each of the flanges also may have only one such free edge forming only one such wedge surface.

Two clamping members 18 and 19 are further provided, each formed with a wedge surface opposite to the wedge surface 17 of the flanges of the segments 14 and 15. The clamping members 18 and 19 can be shifted over the flanges 16 of the adjacent segments 14 and 15 by their movement in two opposite directions which are identified by arrows 20 and 21 in FIG. 1. The clamping members are constituted of an electrically insulating material, such as a non-metallic material, and preferably of a synthetic plastic material.

Figure 3:
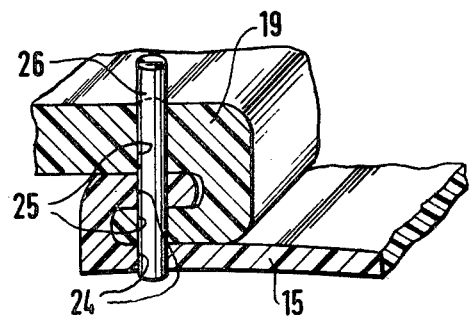
FIG. 3 is a fragment of a section corresponding to FIG. 2 in the region of a connecting pin.

As shown in FIG. 1, the rib-shaped projections 12 of the segments are provided with a through bore 22 formed in a central region of each projection. All of the thus-formed bores 22 are in alignment with one another as considered in a circumferential direction of the annular body 11. A cord 23 or the like member extends through the bores 22 of the projections 12 and serves as an auxiliary mounting member so that all the segments can be held together and thereby prevented from removal from the pipe 10. The bores 22 and therefore the cord 23 are located at a height exceeding the height of the flanges 16 plus the thickness of the clamping members. The flanges 16 of the segments have through bores 24, and the clamping members 18 and 19 have through bores 25 which can be aligned with the bores 24 of the flanges 16. A member of an electrically insulated material such as a wooden shearing pin 26 is inserted into the aligned bores 24 and 25 so as to further serve as auxiliary means for mounting. As shown in FIG. 3 the shearing pin 26 inserted in the bores 24 and 25 provides for firm initial connection of the clamping members 18 and 19 with the segments 14 and 15 for a preliminary mounting. During a final mounting of the segments, the latter are tightly fitted on the outer surface of the pipe 10 by further shifting of the clamping members 18 and 19 over the flange portions 16 of the segments with shearing off of the shearing pins 26. A height of the projections 12 must be greater than the height of the flanges 16 plus the thickness of the clamping member.

Figure 2:
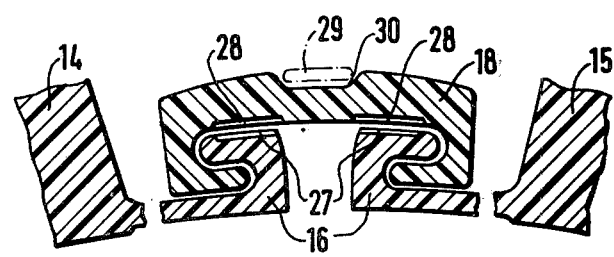
FIG. 2 is a section of flange portions of two adjacent segments and of clamping members shifted over the flange portions.
Figure 4:
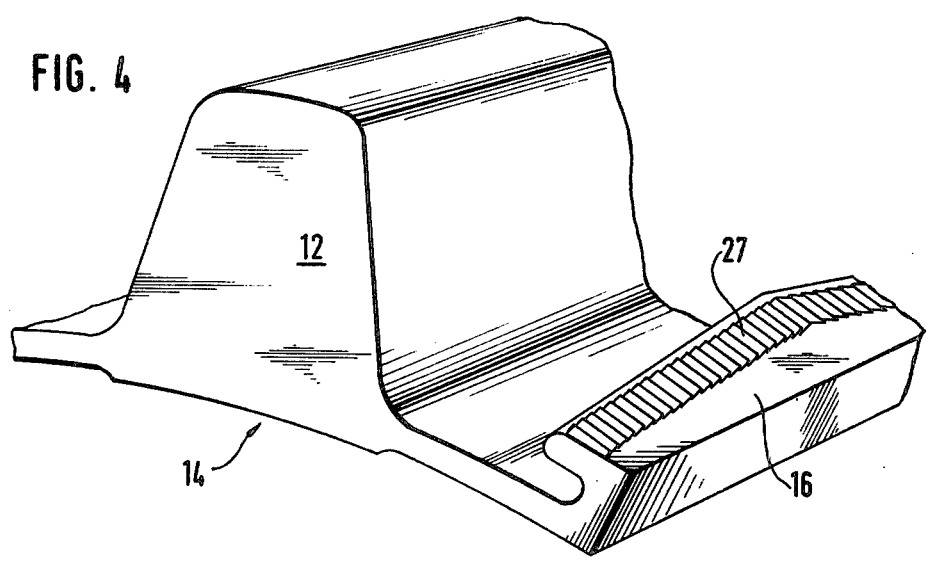
FIG. 4 is a perspective view of an end portion of a segment of the spacing element.

As shown in FIGS. 2 and 4, the flange portions 16 have upper surfaces 27 provided with teeth, whereas the clamping members 18 and 19 have opposite surfaces 28 also provided with teeth meshing with the teeth of the surfaces 27. At the same time, these surfaces are so formed that during shifting of the clamping members 18 and 19 over the flange portions 16 of the segments the teeth are not subject to breakage, but after the fitting prevent the clamping members from withdrawal from the flange portions. A strap 29 may be inserted in a central longitudinal groove 30 of the clamping members 18 and 19 after completing the mounting of the annular body 11 and serves as additional securing means, as shown in FIG. 2. The toothed surfaces 27 and 28 are substantially parallel to lower surfaces of the segments abutting against the outer surface of the pipe 10.

FIGS. 5–9 show further embodiments of the spacing element in accordance with the present invention.

Figure 5:
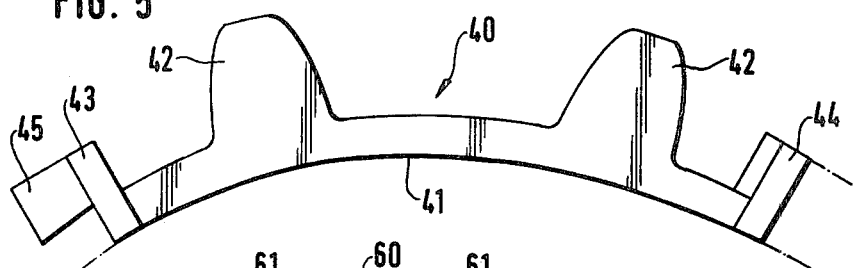
FIG. 5 is a perspective view of a segment in accordance with another embodiment of the present invention.
Figure 8:
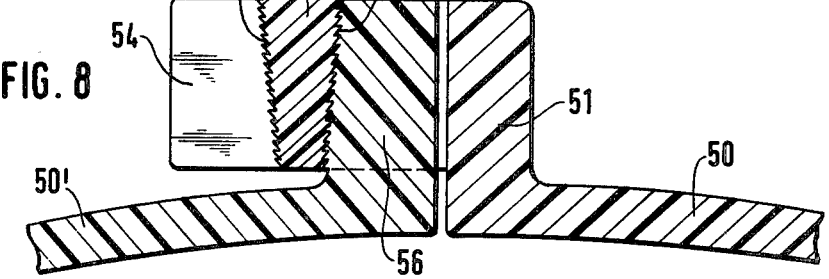
FIG. 8 is a section on the line VIII—VIII of FIG. 7.

FIG. 5 shows a segment 40 having a mating surface 41 and provided with two projections 42 serving as slide skids. Two flanges 43 and 44 are formed at opposite ends of the segment 40 and have a different shape and a height smaller than the height of the projections 42 so that the flanges cannot be brought into contact with the protective pipe. The flange 43 has several, particularly two, projections 45 extending in the circumferential direction, whereas the other flange 44 completely corresponds to not shown recess in which the projection 45 of the adjacent segment is inserted.

Figure 6:
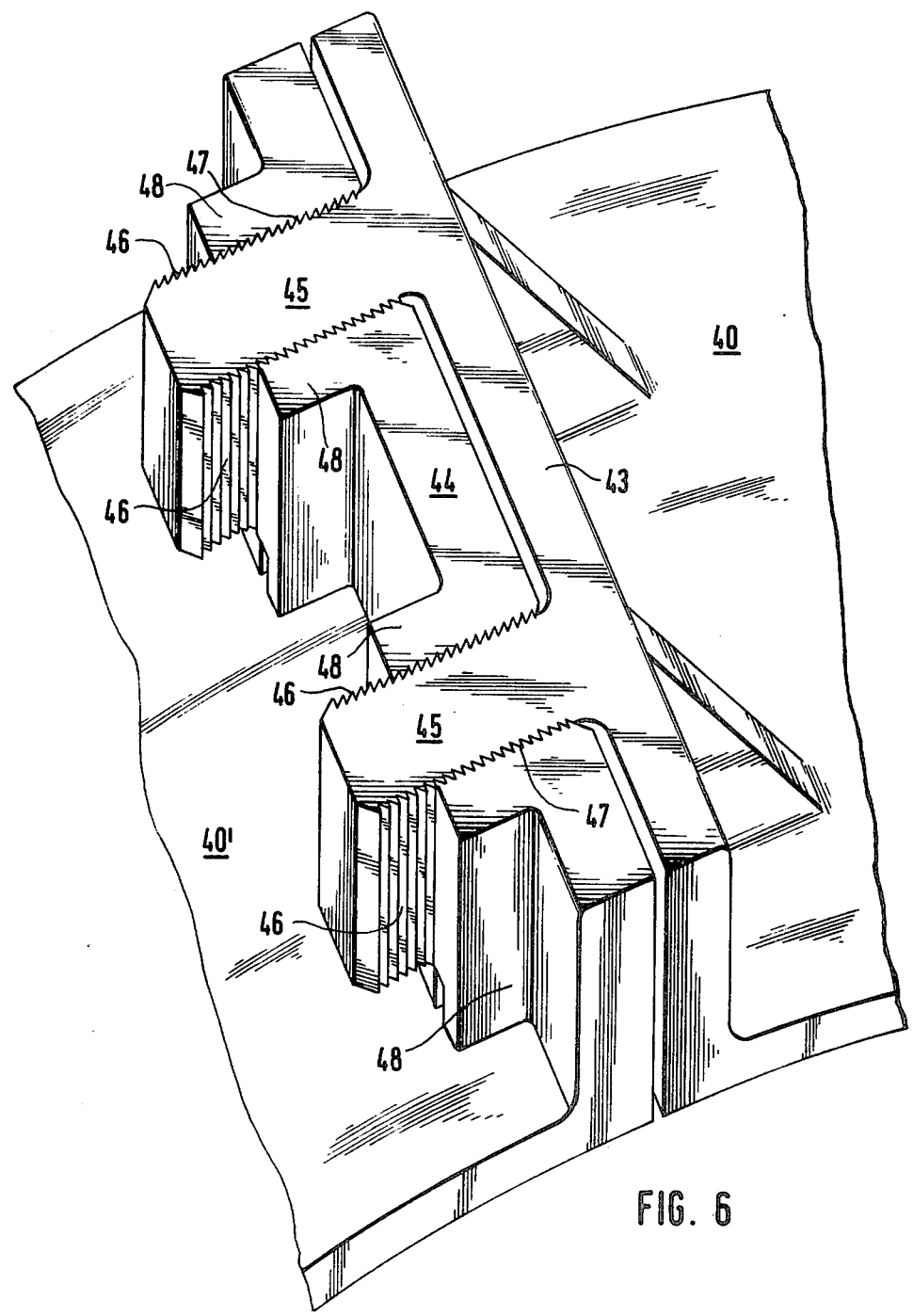
FIG. 6 is a perspective view of two segments in accordance with the embodiment shown in FIG. 5 in connected condition.

FIG. 6 shows two segments 40 and 40' connected with one another. A flange 43 of the segment 40 has two projections 45 extending in the circumferential direction and provided with teeth 46 on the longitudinal surfaces thereof. A flange 44 of the adjacent segment 40' has two recesses 47 whose wall surfaces are also provided with teeth 46, and projections 48 surrounding the flanges 45. The projections 45 of the flange 43 of the segment 40 are inserted into the recesses 47 of the flange 44 of the segment 40' and thereby the segments are connected with one another and securely prevented from separating under the action of forces applied in the circumferential direction.

Figure 7:
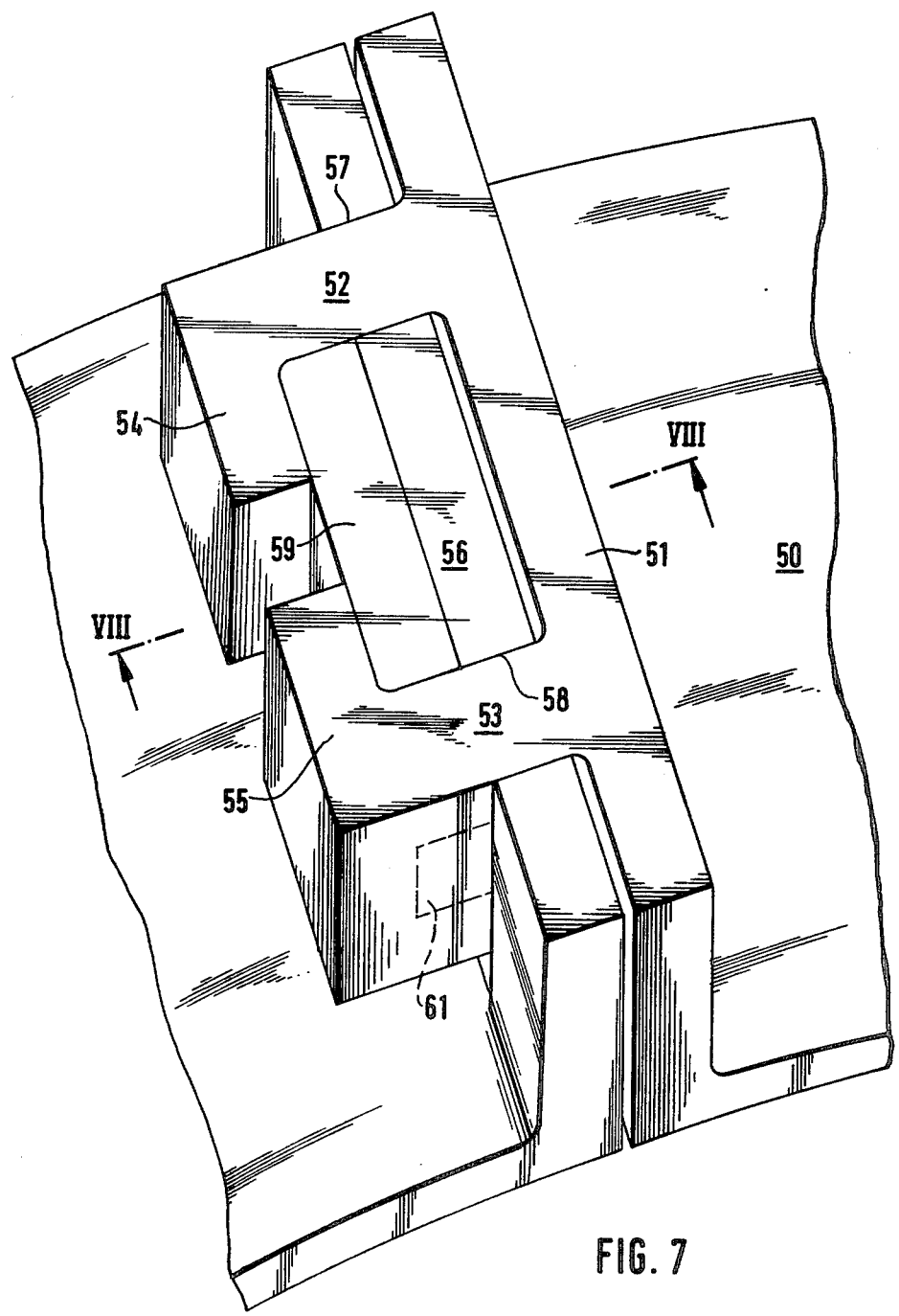
FIG. 7 is a perspective view of two segments of a spacing element in connected condition in accordance with a further embodiment of the present invention.

FIG. 7 shows a spacing element in accordance with a further embodiment of the present invention, having two segments 50 and 50'. The segment 50 has a connecting flange 51 at its end, which flange has, in turn, two projections 52 and 53. The projections 52 and 53 has head portions 54 and 55 extending normal to the former. The adjacent segment 50' has a connecting flange 56 at its end, which flange has, in turn, two recesses 57 and 58 shaped in accordance with the projections 52 and 53. As shown in the drawing, the recesses 57 and 58 extend substantially radially so that the projections 52 and 53 can be inserted from above by movement in the radial direction into the recesses 57 and 58.

After connecting the connecting flanges 51 and 56 with one another an intermediate space 59 is formed between the respective surfaces of the connecting flange 56 and the head portions 54 and 55 of the projections 52 and 53 of the flange 51, as shown in FIG. 7. A wedge member 60 having a wedge surface 61 provided with teeth is inserted into the thus-formed space 59. An opening 61' may further be provided in the projection 53, as shown in broken lines of FIG. 7. A not shown wedge member may be similarly inserted in the opening 61 by movement in a lateral direction so as to assure firm connection between the segments 50 and 50'.

Figure 9:
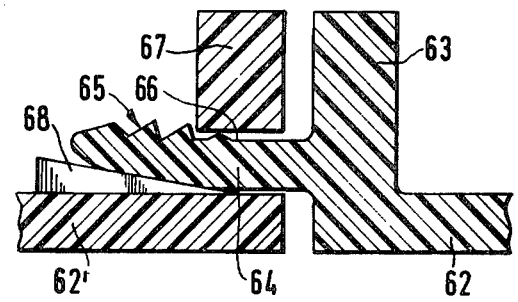
FIG. 9 is a section corresponding to FIG. 8 of two segments in connected condition in accordance with a still further embodiment of the present invention.

FIG. 9 shows a still further embodiment of the present invention where the spacing element has two segments 62 and 62'. The segment 62 has a connecting flange 63 provided with a substantially flat projection 64. Teeth 65 are formed on an upper surface of the projection 64. The adjacent segment 62' has a connecting flange 67 with a bore 66 through which bore the projection 66 of the segment 62 extends. The projection 64 of the connecting flange 63 of the segment 62 is inserted into the bore 66 of the projection 67 of the segment 62. A withdrawal of the projection 64 from the bore 66 is prevented by a wedge member 68 inserted between an upper surface of the connecting flange 62' and a lower surface of the projection 64. In this case the toothed upper surface 65 of the projection 64 engages with a lower wall of the bore 66.

It will be understood that each of the elements described above, or two or more together, may also find a useful application in other types of constructions differing from the types described above.

While the invention has been illustrated and described as embodied in a spacing element for spacing a pipe from an outer protective pipe, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A spacing element for spacing a pipe from a pipe outwardly surrounding the latter, comprising an annular body including a plurality of segments adapted to be placed on an outer surface of the first-mentioned pipe and each having a plurality of projections provided with slide surfaces and adapted to abut against an inner surface of the second-mentioned pipe which outwardly surrounds said first-mentioned pipe, each of said segments having two end sections spaced from one another in a circumferential direction and each provided with a flange portion having at least one wedge surface, said segments having a longitudinal axis, and said flange portions of each of said segments being trough-shaped and having two ends spaced from one another in said longitudinal direction and a free edge extending at least from one of said ends at a predetermined angle relative to the longitudinal direction so as to define said wedge surface; and means for connecting said segments with one another including a plurality of electrically insulating wedge-shaped connecting portions, each of said connecting portions being a clamping member which is discrete from said segments and has at least one opposite wedge surface adapted to cooperate with the wedge surface of the flanges of the end sections of two adjacent segments, each of said clamping members being trough-shaped and having two further ends spaced from one another in the longitudinal direction and a further surface inclined relative to the longitudinal direction so as to define said opposite wedge surface, said trough-shaped clamping member engaging the trough-shaped flanges of two adjacent segments so as to connect said two segments with one another.

2. The spacing element as defined in claim 1, wherein each of said flange portions of said segments has at least one bore adjacent to one of said ends, said clamping member having at least one further bore alignable with said one bore of a respective flange portion; and further comprising at least one electrically insulating connecting member insertable into said one bore of said flange portion of said segment and into said further bore of said clamping member so as to form a mounting connection between said segment and said clamping member.

3. The spacing element as defined in claim 2, wherein said one bore of said flange portion extends substantially in a radial direction.

4. The spacing element as defined in claim 2, wherein said connecting member is constituted of a nonmetallic material.

5. The spacing element as defined in claim 2, wherein said connecting member is a shearing pin.

6. The spacing element as defined in claim 1, wherein said connecting portions are constituted of a non-metallic material.

7. The spacing element as defined in claim 1, wherein said connecting portions are constituted of a synthetic plastic material.

8. The spacing element as defined in claim 1, wherein said segments are constituted of an electrically insulating material.

9. The spacing element as defined in claim 8, wherein said segments are constituted of a synthetic plastic material.

10. The spacing element as defined in claim 1, wherein each of said flange portions has a second free edge extending from the other end of said flange portion towards said first-mentioned free edge at said predetermined angle relative to the longitudinal direction so as to form a second such wedge surface, said connecting means including a second such trough-shaped clamping member having a second surface inclined relative to the longitudinal direction so as to form a second such opposite wedge surface, said first-mentioned trough-shaped clamping member and said second trough-shaped clamping member engaging the trough-shaped flange portions of two adjacent segments from said opposite ends of said two flange portions, respectively, so as to connect said two segments with one another.

11. The spacing element as defined in claim 10, wherein each of said flange portions of said segments has a central plane extending transverse to the longitudinal direction, said first-mentioned wedge surface and said second wedge surface extending up to said central plane of a respective flange portion.

12. The clamping member as defined in claim 10, wherein each of said flange portions of said segments has at least two bores each adjacent to a respective end of said flange portion, said clamping members each having at least one further bore alignable with each of said bores of said flange portion; and further comprising an electrically insulating connecting member insertable in one of said bores in said flange portion and in said further bore of one of said clamping member in an aligned condition so as to form a mounting connection between said segments and said clamping member at one end of said flange portion.

13. The spacing element as defined in claim 12; and further comprising a second such electrically insulating connecting member insertable in the other bore of said flange portion of said segment and into said further bore of the other clamping member so as to form said mounting connection at the other end of said flange portion.

14. The spacing element as defined in claim 10, wherein each of said clamping members has a groove extending in the longitudinal direction; and further comprising a strap insertable in the grooves of two clamping members when the latter engage the flange portions of two adjacent segments, so as to fix said two clamping members with one another.

15. The spacing element as defined in claim 14, wherein each of said clamping members has a further central plane extending in the longitudinal direction, said groove extending in the direction of said further central plane.

16. The spacing element as defined in claim 1, wherein each of said flange portions has a surface facing towards a surface of said clamping member in an engaged position, said facing surfaces of each of said flange portions and said clamping member being provided with teeth meshable with the teeth of said facing surface of said clamping member and said flange portions, respectively.

17. The spacing element as defined in claim 16, wherein each of said segments has an inner surface adapted to abut on the pipe, said toothed facing surfaces of said flange portions and said clamping member being substantially parallel to said inner surfaces of said segments.

18. The spacing element as defined in claim 1, wherein each of said projections of said segments has a through bore extending in a substantially circumferential direction of said segment; and further comprising an additional connecting member insertable in said through bores of said projections of said segments so as to form a mounting connection of said segments with one another.

19. The spacing element as defined in claim 18 wherein said additional connecting member is a cord.

20. The spacing elements as defined in claim 18, wherein the through bores of said projections of said segments aligned with one another in the circumferential direction.

21. The spacing element as defined in claim 18, wherein said through bores are provided at such height in a radial direction that said additional connecting element in an inserted condition is located above said flange portions of said segments in the radial direction.

22. The spacing element as defined in claim 21, wherein said through bores are provided at such a height in a radial direction that said additional connecting element in the inserted condition is located above said clamping members engaged with said flange portions of said segments, in the radial direction.

23. A spacing element for spacing a pipe from a pipe outwardly surrounding the latter, comprising an annular body including a plurality of segments adapted to be placed on an outer surface of the first-mentioned pipe and each having a plurality of projections provided with slide surfaces and adapted to abut against an inner surface of the second-mentioned pipe which outwardly surrounds said first-mentioned pipe, each of said segments having two end portions spaced from one another in a circumferential direction, and each provided with a flange portion having at least one wedge surface, said flange portions of said segments having a longitudinal axis and a height which is smaller than the height of said projections in a radial direction; and means for connecting said segments with one another including a plurality of electrically insulating wedge-shaped connecting portions, said connecting portions being discrete from said segments and each being a clamping member which has at least one opposite wedge surface adapted to cooperate with the wedge surfaces of the flanges of the end sections of two adjacent segments so as to connect the latter with one another.

24. The spacing element as defined in claim 23, wherein each of said connecting portions has a predetermined thickness in the radical direction, said projections of said segments having a height in the radial direction exceeding the height of said flange portions plus the thickness of said connecting portions in the radial direction.

* * * * *